United States Patent [19]
MacKenzie et al.

[11] 4,298,312
[45] Nov. 3, 1981

[54] DAMAGED VANE LOCATING METHOD AND APPARATUS

[75] Inventors: Michael C. MacKenzie, Pasadena; Reinhold S. Fischer, Los Angeles, both of Calif.

[73] Assignee: Purex Corporation, Lakewood, Calif.

[21] Appl. No.: 60,128

[22] Filed: Jul. 24, 1979

[51] Int. Cl.³ .......................... F01B 25/16; G02B 5/16
[52] U.S. Cl. .................... 415/118; 350/96.26
[58] Field of Search ..................... 415/118; 350/96.26; 356/241

[56] References Cited

U.S. PATENT DOCUMENTS

| | | | |
|---|---|---|---|
| 3,190,286 | 6/1965 | Stokes | 350/96.26 |
| 3,270,641 | 9/1966 | Gosselin | 350/96.26 |
| 3,362,160 | 1/1968 | Bourgeois | 415/118 |
| 3,434,775 | 3/1969 | Gosselin | 350/96 |
| 3,690,775 | 9/1972 | Cousins | 356/241 |
| 3,778,170 | 12/1973 | Howell | 356/241 |
| 3,841,764 | 10/1974 | Stanley et al. | 356/241 |
| 3,917,432 | 11/1975 | Feverstein | 415/118 |
| 3,936,217 | 2/1976 | Trauaglini | 415/118 |
| 4,011,017 | 3/1977 | Feverstein | 415/118 |
| 4,184,743 | 1/1980 | Baker et al. | 350/96.26 |

*Primary Examiner*—William L. Freeh
*Attorney, Agent, or Firm*—William W. Haefliger

[57] ABSTRACT

The method of locating in situ a damaged vane in a front stage of stator vanes of a jet engine, the engine also containing a stage of rotor blades and a rear stage of stator vanes, the rotor blade stage located between the front and rear stator vane stages, the engine including a housing about said stages, the method employing a radiation passing cable having a probe end, said method including:
(a) inserting the probe end of the cable through the housing and between vanes in said rear stage,
(b) extending said probe end of the cable beyond said rear stage and toward blades of said rotor blade stage,
(c) attaching the probe end of the cable to one of the rotor blades,
(d) rotating said rotor to carry said probe end of the cable relatively past successive vanes in said front stage while maintaining said probe end directed toward the locus of said vanes in said rear stage so that said front stage vanes are successively brought into the field of view of said probe end, and
(e) remotely viewing said successive vanes of the front stage via transmission of an image of the vanes through the cable.

23 Claims, 7 Drawing Figures

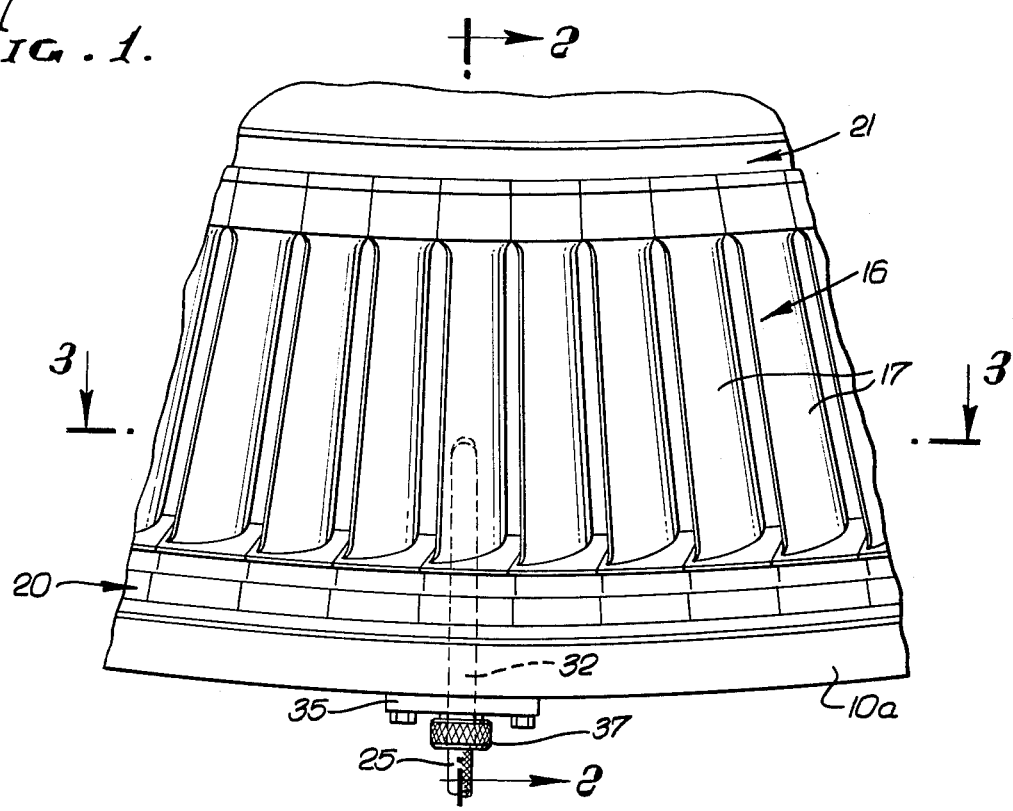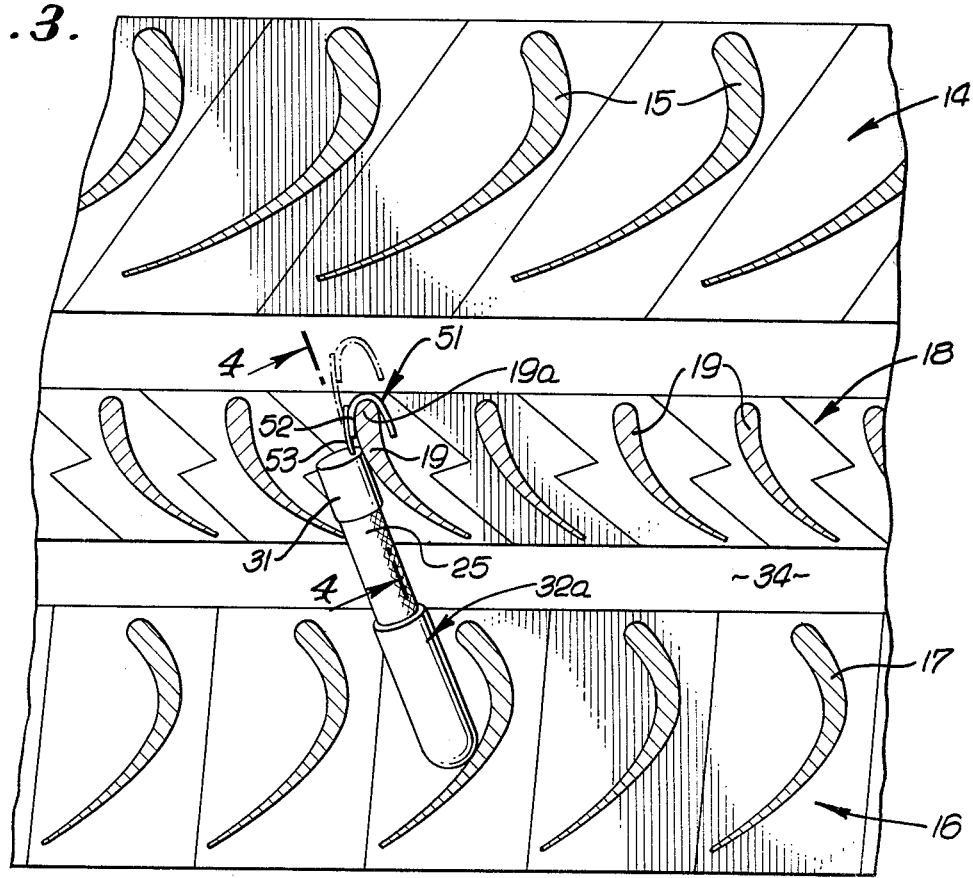

DAMAGED VANE LOCATING METHOD AND APPARATUS

BACKGROUND OF THE INVENTION

This invention relates generally to detection, in situ, of damaged rotor vanes or blades; more particularly it concerns method and apparatus for quickly accessing and viewing a sequence of vanes or blades within the turbine or other section of a rotary engine, without requiring costly disassembly of the engine, for the purpose of determining whether or not a damaged vane or blade exists. If it does exist, expensive inflight engine failures can be prevented by early detection of distressed vanes or blades.

It is found in the operation of rotary engines, such as jet engines, that certain vane or blade elements can and do become damaged by overheating, whereas others remain undamaged. Thus, for example, hot spots can occur in the front stator vane stage rearward of the combustion zone, due to undesired local migration of combustion areas rearwardly to that stator vane stage. As a result, overheating and damage of a stator vane or vanes can occur, leading to eventual burn through of the vane, with resulting engine failure. In the past, such damage frequently remained undetected until engine disassembly or engine failure. No way was known to positively detect the existence and extent of damage to such vanes, without costly engine overhaul or disassembly.

SUMMARY OF THE INVENTION

It is a major object of the present invention to provide a solution to the problems as described above. Basically, the invention now makes it possible to view, in succession, the stator vanes which may be damaged, and without requiring disassembly of the engine, whereby the engine need be disassembled only if stator vane damage due to overheating (or other causes) is positively located or determined. As will be seen, the method involves use of a radiation passing cable (as for example a fiber optics cable) having a probe end insertible into a jet engine typically having front and rear (or first and second) stator vane stages at opposite sides of a rotor blade stage. The steps include:

(a) inserting the probe end of the cable through the housing and between vanes in the rear stage, (b) extending the probe end of the cable beyond the rear stage and toward blades of the rotor blade stage, (c) attaching the probe end of the cable to one of the rotor blades, as for example with fixed position relative to that one blade, (d) rotating the rotor to carry the probe end of the cable relatively past successive vanes in the front stage while maintaining the probe end directed toward the locus of the vanes on said front stage so that the front stage vanes are successively brought into the field of view of the probe end, and (e) remotely viewing successive vanes of the front stage via transmission of an image of the vanes through the cable.

As will be seen, the cable may be inserted into the engine via a thermocouple opening radially outwardly of the rear stator vane stage; a hook may be provided at or in association with the probe end of the cable to anchor to a rotor blade in a manner to orient the probe end of the cable in fixed position relative to that blade, and to maintain such orientation during rotor blade stage rotation; a guide sheath may be employed to turn the cable forwardly within the second or rear stator vane stage so that the hook may be manipulated forwardly and rearwardly to hook onto a rotor blade forward of the rear stator vane stage; and viewing may be carried out by transmitting light through the cable to illuminate a vane or vanes in the front stator van stage, and to transmit images of such a vane or vanes back through the cable, for external viewing. Also, provision is made for manipulating the hook relative to the cable, as will be seen.

In its apparatus aspects, the invention includes:

(a) a radiation passing cable having a probe end, the cable being flexible near that probe end to allow bending of the cable near that end, (b) a hook associated with the probe end of the cable, (c) a guide sheath for the cable, the sheath having a bend from which the probe end of the cable projects, and the cable being movable endwise relative to the sheath, and (d) means for passing radiation into the cable for transmission to and from the probe end of the cable for illumination of an object to be gripped by the hook, or of an element relative to which the probe end is movable, (e) the cable also being usable to transmit light back through the cable for detection of such illumination.

These and other objects and advantages of the invention, as well as the details of an illustrative embodiment, will be more fully understood from the following description and drawings, in which

DRAWING DESCRIPTION

FIG. 1 is a fragmentary frontal view of stator vanes, in an engine;

FIG. 3 is an enlarged plan view taken in section on lines 3—3 of FIG. 1, and showing a stage of rotor blades between stages of stator vanes;

DETAILED DESCRIPTION

Figure 7:
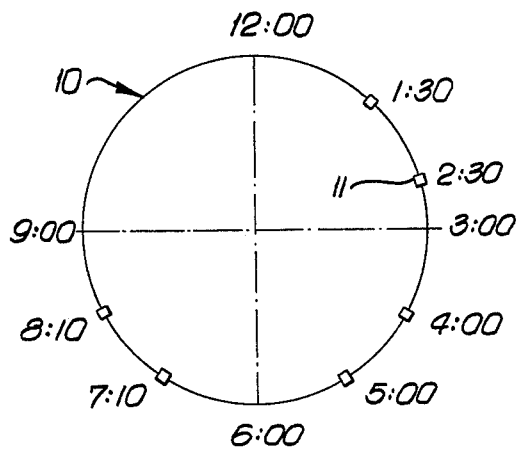
FIG. 7 is a diagrammatic view of a jet engine housing showing typical locations of thermocouples which are selectively removable to allow probe insertion into the engine.

Referring first to FIG. 7, a jet engine housing schematically indicated at 10 has various thermocouple attachment locations about its periphery, designated by the clock angle position indicated. See for example attachment location 11 at the 2:30 clock angle position. That attachment location is exemplified in FIG. 2 by the opening 12 through a mount 13 associated with housing part 10a. The opening 12 is in radial alignment with a second stage 16 of radially extending stator vanes 17. A first stage 14 of stator vanes 15 is spaced axially frontwardly of stage 14, and a stage 18 of rotor blades 19 is located between the stator vane stages 16 and 14. The axial direction is indicated at 22. Merely as illustrative, the stator vanes may be suitably attached as at 20 and 20a to the housing, and the rotor blades may be attached as at 21 to the rotor. The stator vane 17 offset from alignment with opening 12 has attachment structure 20 containing an aperture 23 to allow the thermocouple to sense the engine gas temperature through opening 23.

As previously described, it is found that vanes in stage 14 can become damaged due to undesired combustion at that stage. In this regard, the stages 14, 16 and 18 are typically included within the turbine section of a jet engine, the combustion zone being forward of that section; however, improper combustion can at times travel rearwardly to the turbine section, and combust or occur at or near stage 14. Therefore, it becomes necessary to determine the condition of the vanes in stage 14, prior to the vanes burning through.

Figure 2:
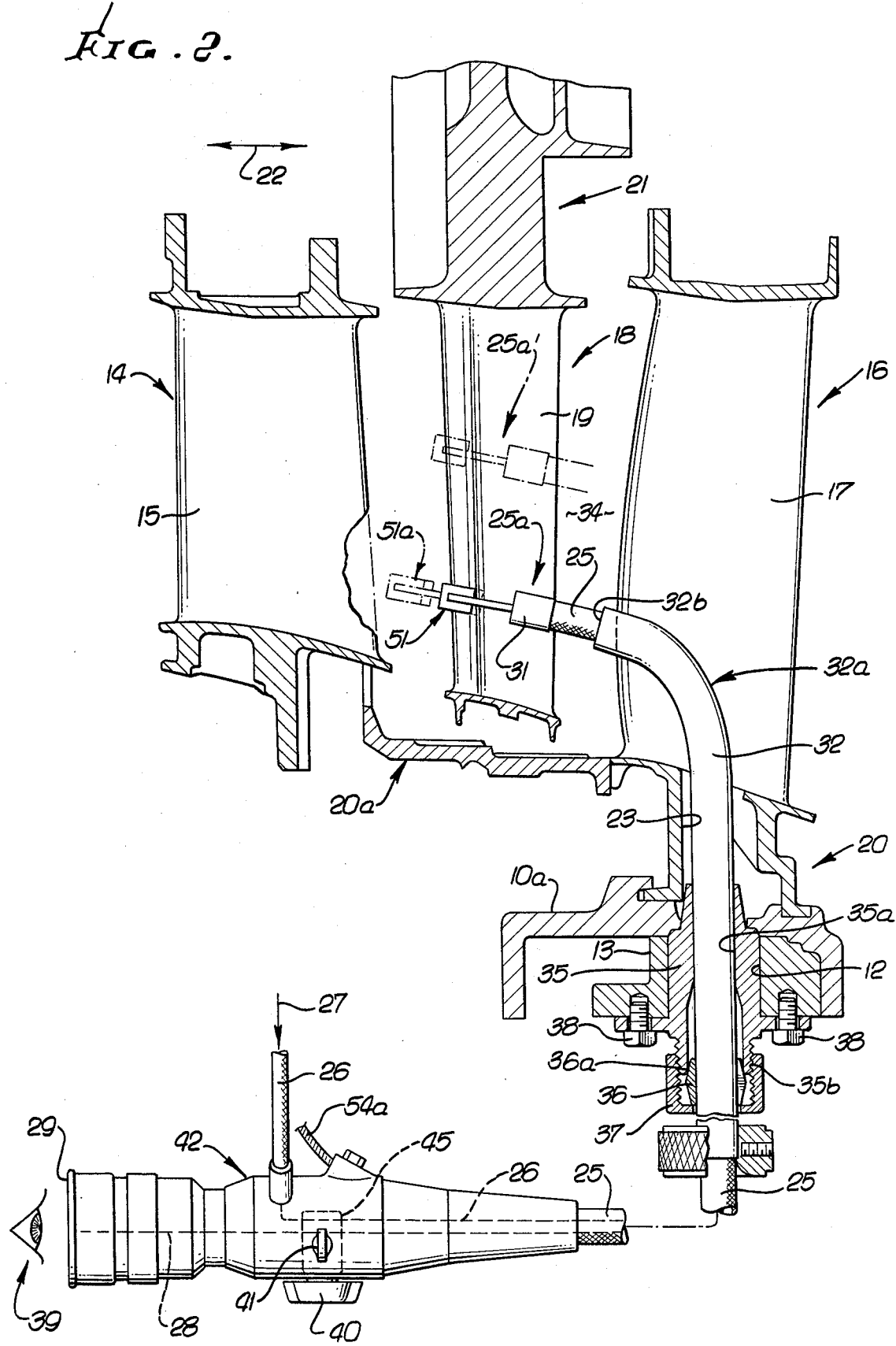
FIG. 2 is an enlarged section taken on lines 2—2 of FIG. 1, and showing the method by which a probe is applicable to the engine and in particular to hook onto a rotor blade in a stage of rotor blades rotatable between fixed stages of stator vanes.
Figure 5:
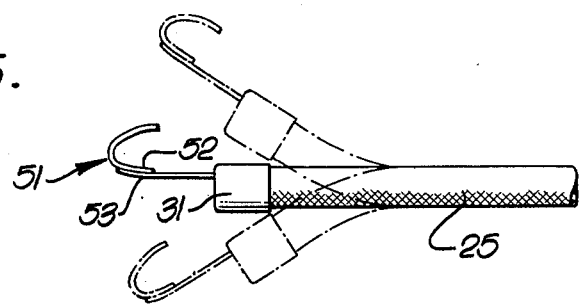
FIG. 5 is a view like FIG. 4, but showing the flexing capability of the probe.
Figure 6:
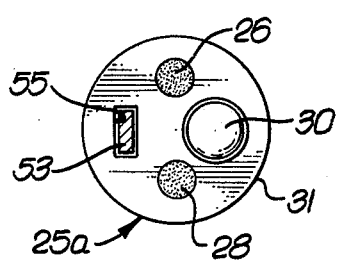
FIG. 6 is an enlarged section on lines 6—6 of FIG. 4.

In accordance with the invention, apparatus is provided to enable viewing, from a remote location successive or different vane elements in the stage 14, and relative to which the blade elements 19 in stage 18 are rotatably movable. Such apparatus basically includes a radiation (or for example light) passing cable 25 having a probe end 25a, the cable being flexible near the end as indicated in FIG. 5 for example, to allow cable bending during operation. Cable 25 may advantageously contain a first bundle 26 of optical fibers to transmit light from a source 27 (FIG. 2) outside the engine to the probe end of the cable inserted into the engine to illuminate a stator vane 15. Two such bundles are shown. The cable may also contain a second bundle 28 of optical fibers to transmit light (emanating from the illuminated stator vane) back through the cable for detection, as by viewing the eyepiece 29 at which that bundle terminates (FIG. 2). A lens 30 at the probe end of the cable receives light from the illuminated stator vane, and passes such light to the entrance terminal of bundle 28 at the probe end 25a of the cable. A cap 31 on that cable end mounts the lens, as shown in FIG. 6.

A guide sheath 32 for the cable is insertible into the wall or housing of the jet engine, through opening 12 and 23 previously described. That sheath may be metallic, and has a bend 32a located between two stator vanes 17 in stage 16. The bend directs the cable 25 forwardly to project from the sheath terminal 32b in the region 34 between stages 16 and 18. The probe end 25a of the cable therefore is manipulable or extensible forwardly (through the sheath with respect to which the cable is movable) and between successive blades in stage 18, which are also viewed.

Note that the sheath may be removably attached to the housing of the jet engine, as via tubular guide 35 for the sheath, a clamp ring 36 and a nut 37. Guide 35 is removably attached via screws 38 to part 13 from which the thermocouple is removed. That guide 35 has a bore 35a slidably receiving the sheath, to allow its manipulation (in and out, and in rotation) to position the sheath end 32b which directs the cable 25. Ring 36 extends closely about the sheath, and nut 37, when tightened on threads 35b on the guide 35, urges the taper 36a on ring 36 against the end of the guide to clamp the ring on the sheath and lock it in selected position. Steering of the sheath, to position the cable, may be accomplished while viewing (at 39) the rotor blade 19 (or the g ap between rotor blades) so as to enable attachment of the probe end of the cable to a blade. The cable 25 may also be rotated in the sheath, and extended and retracted relative thereto, whereby the modes of movement of both the cable and sheath enable most efficient steering of the cable probe end relative to a blade 19, and to that radial portion of the blade to which attachment is desired. For example, note one alternate position of attachment of the probe end of the cable to the blade, shown in broken lines 25a' in FIG. 2. FIG. 2 also shows controls 40 and 41 on a head 42 that carries eyepiece 29, control 40 being rotatable to rotate the cable 25 relative to the head and to the sheath 32, and control 41 being rotatable to lock the cable to the head. Suitable mechanisms may be provided (as at 45) within the head 42 and between the controls and the cable to achieve these cable manipulation and locking functions. There may be a slight friction between the cable and sheath to lightly resist, but not prevent, cable rotation, and endwise movement, relative to the sheath, for gently holding the cable in a selected position relative to the sheath.

Figure 4:
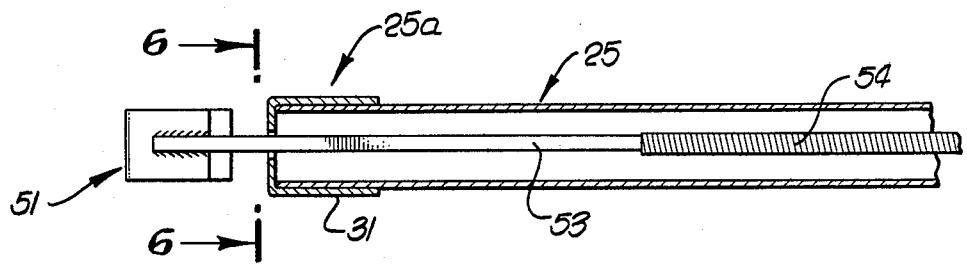
FIG. 4 is an enlarged side elevation showing details of hook structure associated with the probe.

In accordance with an important object of the invention, a hook is provided in association with the probe end of the cable, for hooking onto a rotor blade in a manner such that the probe end of the cable is then anchored in an orientation mode to best illuminate (for viewing purposes) a stator vane 15 or vanes 15 (as during subsequent rotation of the rotor stage 18). One such hook is shown at 51, and comprises a flat metallic strip which has U-shape, and the inner surface of which generally conforms to the leading edge portion 19a of a jet engine rotor blade (see FIG. 3). One leg 52 of the two-legged hook is attached (as via a polygonal cross section connector 53, FIG. 4) to a second cable 54 which is flexible, and typically extends within cable 25 to protrude (at 54a) from the head 42 (FIG. 2). Accordingly, second cable 54 may be manipulated from the exterior of the jet engine to extend and retract the hook, relative to the probe end of the cable 25 (see extended, broken line position 51a of the hook in FIG. 2). This allows the hook to be extended frontwardly of a selected blade 19, and then to be retracted onto the forward portion 19a of that blade, as shown in FIG. 3. It also allows removal of the hook from that blade when removal of the apparatus from the jet engine interior is desired (as by extension, rotation and retraction of the cable and hook).

The connector 53 has a polygonal cross section, as for example a rectangular cross section as shown in FIG. 6, to be rotatably oriented relative to the cable probe end. Thus, the connector may slidably fit a corresponding rectangular opening 55 in the cap, to be guided by the cap edges bounding that opening, whereby the hook does not rotate appreciably relative to the probe end 25a of the cable 25. This facilitates steering of the hook, as by rotation of the cable 25; also it provides known spacial orientation of the hook relative to the light passing bundles 26 and 28, to enable the viewer at 39 to spacially orient the detected view of a stator vane, relative to the rotor blade to which the hook is attached.

A typical operation, employing the described apparatus, involves the following steps:

(a) Inserting the probe end (25a) of the cable 25 through the housing or wall of the engine, and between vanes 17 of second stage 16. This step is facilitated by the insertion of the guide sheath 32 to the position shown in FIG. 2, and attachment of the sheath guide 35 to part 13, as by screws 38.

(b) Extending the probe end of the cable 25 beyond the stage 16 and toward blades 19 of the rotor stage 18.

(c) Attaching the probe end of the cable to one of the rotor blades. This step is facilitated by manipulation of the hook, as described above, and/or manipulation of the cable 25 relative to the sheath 32.

(d) Rotating the rotor to carry the probe end of the cable relatively past successive vanes 15 in front stage 14, while maintaining the probe end directed toward the locus of the vanes in stage 14, so that front stage vanes 15 are successively brought into the field of view of the probe end. This step is typically facilitated by transmitting radiation such as light through the cable 25, to illuminate the vanes 15, and by transmitting an image of the illuminated vane or vanes back through the cable 25 to be viewed at 39.

(e) Remotely viewing successive vanes of the front stage via transmission of an image of such vanes through the cable. Fiber optics may be used, for this purpose, as described above. Also, it will be noted that as the rotor rotates, the flexible cable 25 is fed into the engine, via the sheath, to extend as required in zone 34. The hook firmly engages and fits the rotor blade to which it is attached, and prevents slippage of the probe end of the cable relative to the blade to which it is attached during such cable feeding, whereby the spacial orientation of the light transmitting probe end of the cable is maintained during rotor rotation.

In a more general sense, the invention involves viewing from a remote location a first element associated with a second element, the elements being relatively movable. The steps thus include:

(a) manipulating the cable to bring said hook into proximity to said second element, (b) attaching the hook onto the second element so as to block relative movement of the hook and cable probe end relative to the second element, (c) effecting relative movement of said elements while maintaining said probe end direction toward the locus of said first element so that said first element appears in the field of view of said probe end, and (d) remotely viewing said first element via said fiber optics cable.

We claim:

1. In the method of locating in situ a damaged vane in a front stage of stator vanes of a jet engine, the engine also containing a stage of rotor blades and a rear stage of stator vanes, the rotor blade stage located between the front and rear stator vane stages, the engine including a housing about said stages, the method employing a first radiation passing cable having a probe end, said method including:

(a) inserting the probe end of the cable through the housing and between vanes in said rear stage, (b) extending said probe end of the cable beyond said rear stage and toward blades of said rotor blade stage, (c) providing a hook on a second cable protruding from the probe end of the first cable and hooking said hook to one of the rotor blades by manipulation of the second cable while blocking rotation of the second cable relative to the first cable, so as to block rotation of the first cable relative to said one blade, (d) rotating said rotor to carry said probe end of the cable relatively past successive vanes in said front stage while maintaining said probe end directed toward the locus of said vanes in said rear stage so that said front stage vanes are successively brought into the field of view of said probe end, and (e) remotely viewing said successive vanes of the front stage via transmission of an image of the vanes through the first cable.

2. The method of claim 1 including feeding said cable through the housing and between the vanes of said rear stage as said rotor is rotated.

3. The method of claim 1 wherein said viewing is carried out by transmitting light through the cable to be projected toward the vanes to provide said image.

4. The method of claim 1 including preliminarily providing an opening in said housing to pass said cable, by removing a plug from the housing.

5. The method of claim 4 wherein said plug comprises a thermocouple, and said removal includes removably detaching the thermocouple from the housing.

6. The method of claim 1 including the step of removably anchoring said hook to said one blade.

7. The method of claim 6 wherein said manipulation includes remotely steering said hook toward a selected portion of said one blade to be hooked to said portion, whereby the probe end of the cable is then directed to predetermined portions of the front stage vanes as the rotor rotates.

8. The method of claim 6 wherein the anchoring step is carried out to prevent rotation of the hook and the probe end of the cable relative to the blade to which the hook is attached, during said rotor rotation.

9. In apparatus for viewing from a remote location a first element associated with a second element, the elements being relative movable, the combination comprising (a) a first radiation passing cable having a probe end, the cable being flexible near said probe end to allow bending of the cable near said end, (b) a hook associated with the probe end of the cable, to hook onto the second element, (c) a guide sheath for the cable, the sheath having a terminal from which the probe end of the cable projects, and the cable being movable endwise relative to the sheath, and (d) means for passing radiation into the cable for transmission to and from the probe end of the cable for illumination of the first element, (e) the cable also being usable to transmit light back through the cable for detection of said first element illumination, (f) and including a second cable attached to the hook and extending along the first cable and movable endwise relative thereto, the first radiation passing cable containing a guideway for said second cable, the guideway extending lengthwise of the radiation passing cable and substantially to the probe end thereof, the hook having an inwardly facing surface which is transversely flat along the hook length to engage said second element and block hook rotation relative thereto, whereby the hook locates said (d) means at the probe end of the first cable relative to the second element.

10. The combination of claim 9 including a head at the opposite end of the radiation passing cable, the second cable extending to said head and being manipulable therefrom.

11. The combination of claim 10 wherein said radiation passing cable includes light passing fibers that terminate at said head for transmitting light to an eyepiece carried by the head.

12. The combination of claim 9 wherein said cable includes certain optical fibers to pass said radiation to the probe end of the cable, and other optical fibers to transmit radiation emanating from the illuminated first element back through the cable for said detection.

13. The combination of claim 12 including the second element in the form of a rotor blade gripped by the hook, there being a stage of rotor blades associated with the gripped blade, there also being first and second stages of stator vanes at opposite sides of said stage of rotor blades, said guide sheath extending between two stator vanes associated with one of said stator vane stages.

14. The combination of claim 9 wherein said hook comprises a flat metallic strip which has U-shape to define two legs, one of said legs attached to said second cable.

15. The combination of claim 14 including a jet engine housing extending about said stages, there being a thermocouple opening in the housing and through which said guide sheath extends.

16. In apparatus for viewing from a remote location a first element associated with a second element, the elements being relative movable, the combination comprising
  (a) a first cable having a probe end, the cable being flexible near said probe end to allow bending of the cable near said end,
  (b) a hook located near the probe end of the cable to hook onto the second element,
  (c) a guide sheath for the cable, the sheath having a terminal from which the probe end of the cable projects, and the cable being movable endwise relative to the sheath, and
  (d) means for passing radiation in the cable for transmission to and from the probe end of the cable for illumination of the first element, and
  (e) a second cable attached to the hook and extending along said first cable and movable endwise relative thereto, the first cable defining a guideway for said second cable, the guideway extending substantially to the probe end of the first cable, and the guideway blocking relative rotation of the two cables proximate the hook end of the second cable, the hook having an inwardly facing surface which is transversely flat along the hook length to engage said second element and block hook rotation relative thereto, whereby the hook locates said (d) means at the probe end of the first cable, relatively to the second element.

17. The combination of claim 16, including a head at the opposite end of the first cable, the second cable extending to said head and being manipulable therefrom.

18. The combination of claim 17 wherein said means includes light passing fibers that terminate at said head for transmitting light to an eyepiece carried by the head.

19. The combination of claim 16 wherein said means includes certain optical fibers to pass said radiation to the probe end of the cable, and including other optical fibers to transmit radiation emanating from the illuminated first element back through the cable for said detection.

20. The combination of claim 16 wherein said hook comprises a flat metallic strip which has U-shape to define two legs, one of said legs attached to said second cable.

21. The combination of claim 16 including the second element in the form of a rotor blade having a leading edge gripped by the hook, there being a stage of rotor blades associated with the gripped blade, there also being first and second stages of stator vanes at opposite sides of said stage of rotor blades, said guide sheath extending between two stator vanes associated with one of said stator vane stages, said first element being one of said stator vanes.

22. The combination of claim 21 including a jet engine housing extending about said stages, there being a thermocouple opening in the housing and through which said guide sheath extends.

23. The combination of claim 22 including means adjustably attaching the guide sheath to the housing for rotation of the sheath relative to the housing and for linear extension and retraction of the sheath, relative to the housing.

* * * * *